US011910833B2

(12) United States Patent
Liu

(10) Patent No.: US 11,910,833 B2
(45) Date of Patent: Feb. 27, 2024

(54) TOBACCO ROASTER

(71) Applicant: Shenzhen Eigate Technology Co., Ltd., Shenzhen (CN)

(72) Inventor: Tuanfang Liu, Shenzhen (CN)

(73) Assignee: ASPIRE NORTH AMERICA LLC

( * ) Notice: Subject to any disclaimer, the term of this patent is extended or adjusted under 35 U.S.C. 154(b) by 430 days.

(21) Appl. No.: 17/125,966

(22) Filed: Dec. 17, 2020

(65) Prior Publication Data

US 2022/0061393 A1 Mar. 3, 2022

(30) Foreign Application Priority Data

Aug. 25, 2020 (CN) ......................... 202010867979.8
Aug. 25, 2020 (CN) ......................... 202021819299.0

(51) Int. Cl.

| | |
|---|---|
| ***A24F 47/00*** | (2020.01) |
| ***A24F 40/465*** | (2020.01) |
| ***A24F 40/48*** | (2020.01) |
| ***A24F 40/20*** | (2020.01) |
| ***H05B 6/10*** | (2006.01) |

(52) U.S. Cl.

CPC ............ *A24F 40/465* (2020.01); *A24F 40/20* (2020.01); *A24F 40/48* (2020.01); *H05B 6/105* (2013.01)

(58) Field of Classification Search

CPC ........ A24F 40/465; A24F 40/46; A24F 40/20; H05B 6/105

See application file for complete search history.

(56) References Cited

U.S. PATENT DOCUMENTS

2020/0022414 A1* 1/2020 Leeds ................... H02J 7/0013
2022/0304380 A1* 9/2022 Whiffen .................. A24F 40/85

FOREIGN PATENT DOCUMENTS

CN 107150547 A * 9/2017
CN 208064487 U * 11/2018
WO WO-2017220273 A1 * 12/2017 ........... A24B 15/167

OTHER PUBLICATIONS

BFL Metal Production LTD, Fume Extra Vape Electronic E Cigarette, Jun. 11, 2015; https://szhongyi.en.made-in-china.com/product/MwxaZjHUCfGS/China-Wholesale-Price-Fume-Disposable-Vape-1500-Puffs-Fume-Extra-Vape-Electronic-E-Cigarette.html (Year: 2015).*

Joyetech Europe Holding Gmbh, Electronic Cigarette—English Translation, Mar. 3, 2023, European Patent Office (Year: 2023).*

Li Jianyou, Manufacturing method for inlaying metal in glass—English Translation, Feb. 21, 2023, European Patent Office (Year: 2023).*

* cited by examiner

*Primary Examiner* — Eric Yaary

(74) *Attorney, Agent, or Firm* — MATTHIAS SCHOLL P.C.; Matthias Scholl

(57) ABSTRACT

A tobacco roaster includes a heating rod which is retractable. The heating rod includes a through hole and an air passage communicating with the through hole. The heating rod is configured to heat a tobacco material to produce smoke, and the smoke enters the air passage via the through hole.

5 Claims, 3 Drawing Sheets

TOBACCO ROASTER

CROSS-REFERENCE TO RELATED APPLICATIONS

Pursuant to 35 U.S.C. § 119 and the Paris Convention Treaty, this application claims foreign priority to Chinese Patent Application No. 202010867979.8 filed on Aug. 25, 2020, and to Chinese Patent Application No. 202021819299.0 filed on Aug. 25, 2020. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to a tobacco roaster.

Conventionally, a tobacco roaster comprises a fixed heating rod. The length of the heating rod is non-adjustable.

SUMMARY

The disclosure provides a tobacco roaster comprising a heating rod which is retractable; the heating rod comprises a through hole and an air passage communicating with the through hole; the heating rod is configured to heat a tobacco material to produce smoke, and the smoke enters the air passage via the through hole.

In a class of this embodiment, the tobacco roaster further comprises a slidable cover disposed on a surface of the tobacco roaster; the slidable cover is configured to control the heating rod to extend out of or retract into the tobacco roaster.

In a class of this embodiment, the tobacco roaster further comprises a smoke tube fixed in the tobacco roaster.

In a class of this embodiment, the tobacco roaster further comprises a connecting sleeve and a guide tube; the connecting sleeve comprises a thermal insulation material and is fixedly disposed between the heating rod and the guide tube; a lower end of the guide tube is removably disposed in the smoke tube; and the guide tube is movable with respect to the smoke tube.

In a class of this embodiment, the tobacco roaster further comprises a fixed screw and a sliding sleeve; the connecting sleeve is disposed in the sliding sleeve; the fixed screw runs through the slidable cover and is screwed on the sliding sleeve thus fixing the connecting sleeve and the sliding sleeve; and the slidable cover is configured to drive the heating rod to move.

In a class of this embodiment, the top of the upper end is hemispherical, and the through hole is cross-shaped.

In a class of this embodiment, the tobacco roaster further comprises a magnetic induction coil; when an alternating current flows through the magnetic induction coil, an alternating magnetic field is produced; an eddy current is formed in the heating rod placed in the alternating magnetic field to heat up an upper end of the heating rod.

In a class of this embodiment, the upper end of the heating rod is a glass tube inlaid with a metal tube.

In a class of this embodiment, the tobacco roaster further comprises a ceramic sleeve disposed in the magnetic induction coil and between the magnetic induction coil and the upper end of the heating rod.

DETAILED DESCRIPTION

To further illustrate, embodiments detailing a tobacco roaster are described below. It should be noted that the following embodiments are intended to describe and not to limit the disclosure.

Figure 1:
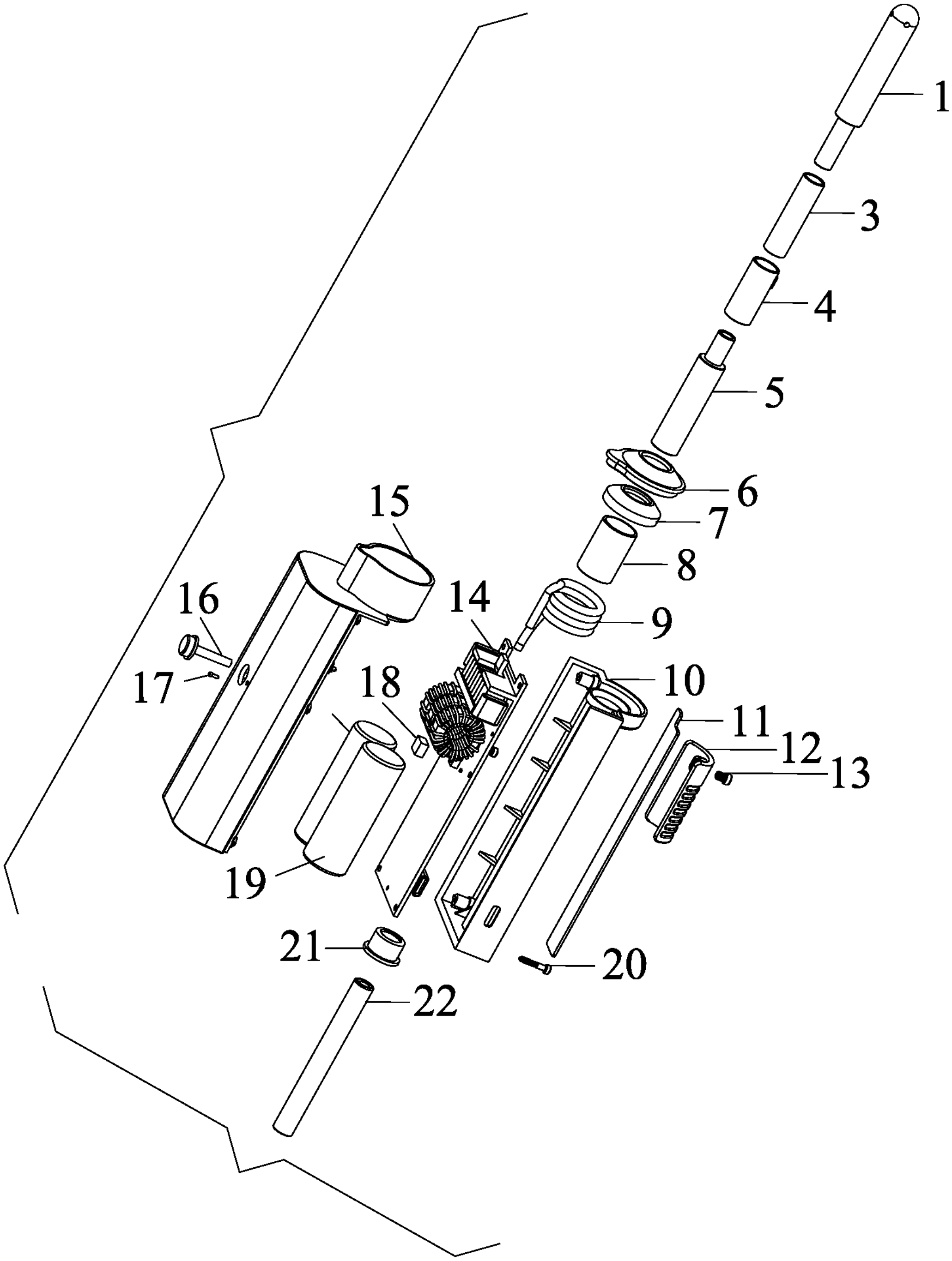
FIG. 1 is an exploded view of a tobacco roaster in accordance with one embodiment of the disclosure.
Figure 2:
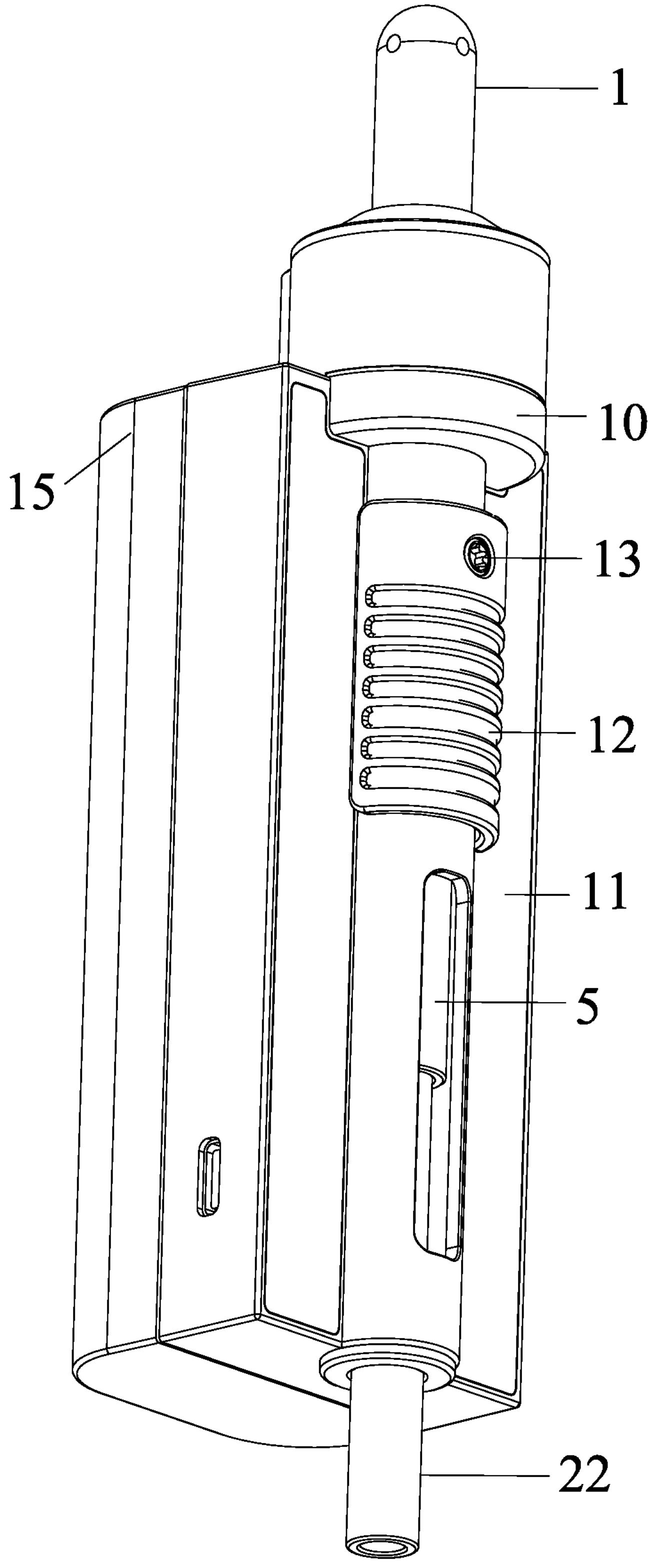
FIG. 2 is a schematic diagram of a tobacco roaster in accordance with one embodiment of the disclosure.
Figure 3:
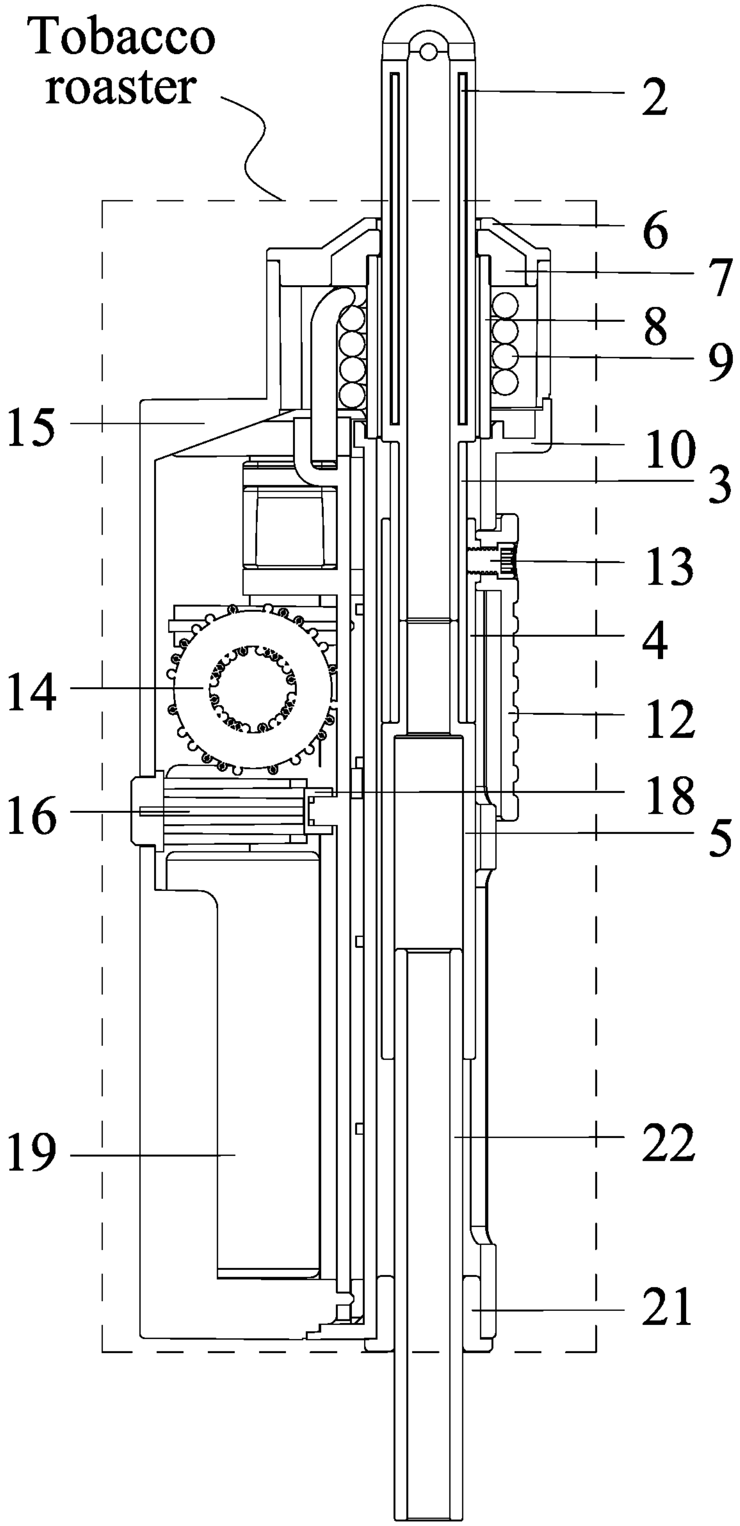
FIG. 3 is a sectional view of a tobacco roaster in accordance with one embodiment of the disclosure.

As shown in FIGS. 1-3, the disclosure provides a tobacco roaster comprising a heating rod 1, a connecting sleeve 3, a sliding sleeve 4, a guide tube 5, a front cover 6, a silicone ring 7, a ceramic sleeve 8, a magnetic induction coil 9, an upper cover 10, a decorative sheet 11, a slidable cover 12, a fixed screw 13, a control panel 14, a lower cover 15, a press button 16, a light column 17, a first silicone sleeve 18, a battery 19, a screw 20, a second silicone sleeve 21, and a smoke tube 22. The upper end of the heating rod 1 is a glass tube inlaid with a metal tube 2, and the top of the upper end is hemispherical, and comprises a cross shaped through hole communicating with the internal air passage of the heating rod. The connecting sleeve 3 is made of silica gel and is thermal insulated; the sliding sleeve 4 is made of stainless steel; the guide tube 5 and the smoke tube 22 are glass tubes. The heating rod 1 is fully retractable into the main body of the tobacco roaster, or part of the heating rod is exposed outside the main body of the tobacco roaster. In this example, the heating rod is fully retractable into the main body of the tobacco roaster. The lower end of the heating rod is disposed in the connecting sleeve 3. The upper end of the guide tube 5 is fixed in the connecting sleeve 3 to extend the smoke passage thus reducing the smoke temperature. The ceramic sleeve 8 is disposed in the magnetic induction coil 9. The upper cover 10 comprises a top groove and the magnetic induction coil 9 is disposed in the top groove. The upper end of the heating rod 1 is disposed in the ceramic sleeve 8. The slidable cover 12 is secured to the surface of the upper cover 10. The fixed screw 13 runs through the slidable cover 12 and is screwed on the sliding sleeve 4 thus fixing the connecting sleeve 3 and the sliding sleeve 4. The positive and negative electrodes of the battery 19 are soldered on the positive and negative electrodes of the input end of the control panel 14, and the control panel 14 is disposed in the cavity of the upper cover 10, and then fixed with the screw 20, and the output end of the control panel 14 is soldered to the lead wire of the magnetic induction coil 9. The second silicone sleeve 21 is fixed on the rear end of the upper cover 10. The smoke tube 22 passes through the second silicone sleeve 21 and the upper end of the smoke tube 22 is disposed in the guide tube 5. The smoke tube 22 is stationary and the guide tube 5 is movable with respect to the smoke tube 22. The first silicone sleeve 18 is disposed on the power button of the control panel 14. The lower cover 15 is arranged on the bottom of the upper cover 10, and the upper end of the lower cover 15 is disposed around the magnetic induction coil 9. The silicone ring 7 is disposed in the front cover 6. The front cover 6 is disposed in the top opening of the lower cover 15. The press button 16 and the light column 17 are disposed on the lower cover 15. The decorative sheet 11 is attached to the surface of the upper cover 10.

When an alternating current flows through the magnetic induction coil, an alternating magnetic field is produced. In this way, an eddy current is formed in a metal conductor placed in the alternating magnetic field, and the eddy current in the metal conductor will make the metal conductor heat up. In certain embodiments, the upper end of the heating rod 1 is a glass tube inlaid with a metal tube, and the heating of the metal part of the heating rod causes the glass part contacting the metal part to heat up, so that the heating rod can be used to heat smoke materials such as tobacco paste.

In certain embodiments, the heating part of the heating rod is made of metal, or part of the heating part is made of metal. As needed, the heating part can be entirely or partly retractable into the tobacco roaster.

The following advantages are associated with the tobacco roaster of the disclosure:

1. The tobacco roaster comprises a retractable heating rod, which is convenient for carrying.
2. The tobacco roaster comprises a guide tube; the design extends the smoke passage thus reducing the smoke temperature.
3. The tobacco roaster is compact and is easy to carry.

It will be obvious to those skilled in the art that changes and modifications may be made, and therefore, the aim in the appended claims is to cover all such changes and modifications.

What is claimed is:

1. A device, comprising a heating rod which is retractable, a smoke tube fixed in the device, a connecting sleeve, and a guide tube; wherein the heating rod comprises a through hole and an air passage communicating with the through hole; the heating rod is configured to heat a tobacco material disposed externally to the device to produce smoke, and the smoke enters the air passage via the through hole; an upper portion of the heating rod comprises a glass tube; a metal tube is embedded inside a lateral wall of the glass tube, and surfaces of the metal tube are covered by the glass tube; a top end of the upper portion of the heating rod is hemispherical; the through hole is disposed on the top end; and the through hole is cross-shaped;

the connecting sleeve comprises a thermal insulation material and is fixedly disposed between the heating rod and the guide tube; a lower end of the guide tube is removably disposed in the smoke tube; and the guide tube is movable with respect to the smoke tube; and when in use, the heating rod is in a configuration extending outside the device to heat the tobacco material disposed externally to the device to produce the smoke, and the smoke flows from the tobacco material to the air passage via the through hole.

2. The device of claim 1, further comprising a slidable cover disposed on a surface of the device, wherein the slidable cover is configured to control the heating rod to extend out of or retract into the device.

3. The device of claim 2, further comprising a fixed screw and a sliding sleeve, wherein the connecting sleeve is disposed in the sliding sleeve; the fixed screw runs through the slidable cover and is screwed on the sliding sleeve thus fixing the connecting sleeve and the sliding sleeve; and the slidable cover is configured to drive the heating rod to move.

4. The device of claim 3, further comprising a magnetic induction coil, wherein when an alternating current flows through the magnetic induction coil, an alternating magnetic field is produced; an eddy current is formed in the heating rod placed in the alternating magnetic field to heat up an upper end of the heating rod.

5. The device of claim 4, further comprising a ceramic sleeve disposed in the magnetic induction coil and between the magnetic induction coil and the upper end of the heating rod.

* * * * *